United States Patent
Goelst et al.

(10) Patent No.: US 10,702,059 B2
(45) Date of Patent: Jul. 7, 2020

(54) BOX CARCASS ASSEMBLY METHOD

(71) Applicants: Mac Goelst, Bend, OR (US); Luke Wright, Bend, OR (US)

(72) Inventors: Mac Goelst, Bend, OR (US); Luke Wright, Bend, OR (US)

(*) Notice: Subject to any disclaimer, the term of this patent is extended or adjusted under 35 U.S.C. 154(b) by 190 days.

(21) Appl. No.: 15/662,122

(22) Filed: Jul. 27, 2017

(65) Prior Publication Data
US 2018/0360210 A1 Dec. 20, 2018

Related U.S. Application Data

(63) Continuation-in-part of application No. 15/628,223, filed on Jun. 20, 2017.

(51) Int. Cl.
| | |
|---|---|
| *F16B 5/00* | (2006.01) |
| *A47B 47/00* | (2006.01) |
| *F16B 12/10* | (2006.01) |
| *A47B 47/02* | (2006.01) |
| *F16B 5/06* | (2006.01) |
| *A47B 87/00* | (2006.01) |
| *F16B 12/50* | (2006.01) |
| *F16B 12/30* | (2006.01) |
| *F16B 12/36* | (2006.01) |
| *F16B 37/00* | (2006.01) |
| *A47B 47/03* | (2006.01) |

(52) U.S. Cl.
CPC ...... *A47B 47/0091* (2013.01); *A47B 47/0083* (2013.01); *A47B 47/02* (2013.01); *F16B 5/0614* (2013.01); *F16B 12/10* (2013.01); *A47B 47/03* (2013.01); *A47B 87/008* (2013.01); *F16B 5/0036* (2013.01); *F16B 12/30* (2013.01); *F16B 12/36* (2013.01); *F16B 12/50* (2013.01); *F16B 37/005* (2013.01)

(58) Field of Classification Search
CPC .............. A47B 47/0091; A47B 47/047; A47B 47/0025; A47B 47/005; A47B 47/02; A47B 47/03; F16B 12/02; F16B 5/004; F16B 5/0052; F16B 5/02; H05K 7/18; H05K 7/183; H05K 5/0217; H02B 1/03
See application file for complete search history.

(56) References Cited

U.S. PATENT DOCUMENTS 3,870,389 A * 3/1975 Killam .................. A47B 47/03
312/265.3

* cited by examiner

*Primary Examiner* — Christopher J Besler
(74) *Attorney, Agent, or Firm* — Mark S Hubert

(57) ABSTRACT

A method of making a cabinet carcass using a pair of connectable box carcass framework members for the fabrication of non-panel constructed furniture carcasses. It simplifies the construction of a furniture carcass and uses but a minimum of tools and skill to produce a dimensionally square, precisely sized, box that accepts an abundance of aesthetic and functional options. The assembly is based on a pair of mechanical fastener connectable vertical and horizontal members that have connectable zipper channels, linear rabbets for the retention of side panels, screw busses, and open channels with series of spaced orifices therein for the passage of mechanical connectors.

8 Claims, 21 Drawing Sheets

BOX CARCASS ASSEMBLY METHOD

PRIORITY

This patent is a Continuation in Part of, incorporates by reference herein, and claims priority to pending U.S. patent application Ser. No. 29/554,576 entitled "Connectable Box Carcass Framework Members" filed Jun. 20, 2017 which claims priority from U.S. Provisional Patent Application No. 62/354,647 entitled "Cabinet System with Extruded Aluminum Multi-Purpose Components" filed Jun. 24, 2016.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to furniture and cabinet fabrication, and more particularly to a simplistic method of box construction based around a pair of connectable linear members.

BACKGROUND

Boxes are the common element in cabinets, carts, cases and the like. It is the final elements attached to the basic box that defines what it is. The final purpose of the box dictates the dimensions, strength, material of the outer faces, and what functional accessories will be attached.

Traditional methods of construction generally use steel or wood panel assembly, are time consuming to complete, involve the use of numerous precision tools, and most importantly, require an enhanced degree of proficiency with all of the tools and attendant joinery techniques. This results in two major downfalls. Quality cabinetry fabrication is out of the realm of the average person, and the price of quality cabinets is outrageously high.

Henceforth, an improved method of assembling box carcasses using a pair of connectable linear carcass framework members that enable precision furniture and cart fabrication with a minimum of cabinetmaking expertise and equipment, would fulfill a long felt need in the furniture industry. This new method of assembly utilizes and combines known and new technologies in a unique and novel configuration to overcome the aforementioned problems and accomplish this.

BRIEF SUMMARY

In accordance with various embodiments, a method for the fabrication of furniture box carcasses based on two connectable linear carcass framework members that are dimensionally stable (creepless), and can be accurately cut for precise dimensioned carcass fabrication is provided.

In one aspect, a method for the fabrication of furniture and cabinet box carcasses based on a pair of aluminum, connectable linear members that can be fitted for finish with any commercial furniture fittings including but not limited to doors, handles, push bars, drawers, shelves, and lights is provided.

In another aspect, a method for the fabrication of furniture or cabinet box carcasses that incorporates the spaced connection of industry standard dimensioned inner and outer planar panels, available in numerous materials so as to allow customized aesthetic appearances is provided.

In another aspect, a method for the fabrication of furniture or cabinet box carcasses that have internal voids to accommodate wiring for the construction of specialty boxes is provided.

In yet another aspect, a method for the fabrication of furniture or cabinet box carcasses that may be precisely dimensioned for assembly with a minimal of low cost, low tech equipment by one with only rudimentary cabinetmaking skills working in a spatially constrained workshop is provided.

In yet another aspect, a method for the fabrication of furniture or cabinet box carcasses using a pair of aluminum, connectable linear members having dimensions and an extruded strengthened configuration such that the resultant assembled carcass will have a high strength to weight ratio and resist any deformation from its normal (90 degree) side, back bottom and top wall configurations.

In a final aspect, a method of cabinet making that allows for the construction of an extremely versatile, strong, rigid box (even in the field) conforming to a high degree of dimensional tolerances and that can be aesthetically surface finished with wood, polymer, glass, steel or metal, with a minimum of tools, skill and space, is provided.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION

Figure 1:
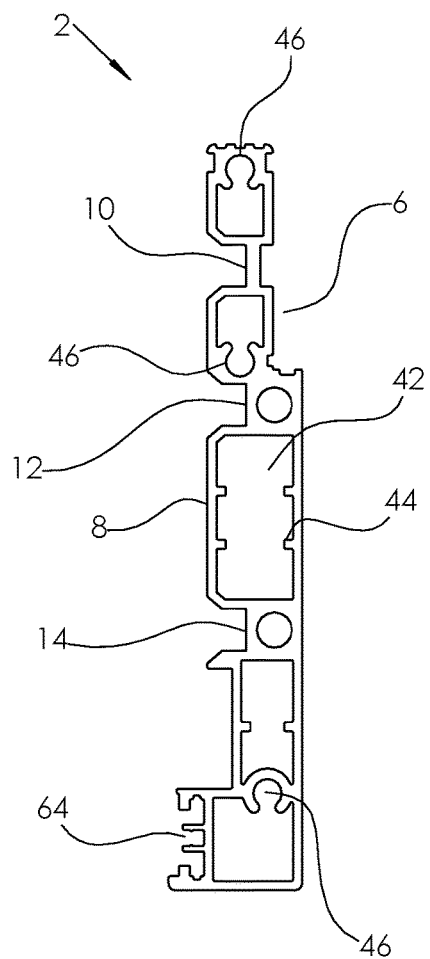
FIG. 1 is an end view of a vertical member.

While various aspects and features of certain embodiments have been summarized above, the following detailed descriptions illustrate at least one exemplary embodiment in further detail to enable one skilled in the art to practice such an embodiment. The described example is provided for illustrative purposes and is not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. While various features are ascribed to different embodiments, it should be appreciated that the features described with respect to one embodiment may be incorporated with other embodiments as well. The present invention is a system for configurable box construction, defined for their final purpose by their exterior and interior face finishes and their installed hardware accessories. No single feature or features of any described embodiment should be considered essential to every embodiment of the invention, as other embodiments of the invention may omit such features.

In this description, the directional prepositions of vertical, horizontal, up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise. The dimensions termed height, width and depth as used in conjunction with the assembly method disclosed herein are denoted on FIG. 21 as H W and D.

As used herein the term "carcass" refers to the unfinished framework or skeleton of a three dimensional box. The finished product of the box may be a cabinet, a cart, a drawer, a case, a display or any of a plethora of other furniture pieces.

As used herein the term "cabinet" refers to any of the various finished items of furniture that the box carcass can be finished into, such as rolling carts, display boxes, drawers, cases, cabinets and the like.

As used herein, the term "screw buss" refers to linear recess with continuous or interrupted side wall/s, adapted for the frictional retention of a mechanical fastener against its inner wall/s.

As used herein the term "squareness" refers to a geometric configuration having 90 degree or perpendicular joints wherever linear members are connected as well as between all planes of adjacent panels whether structural or aesthetic panels. Perfect squareness in a box carcass results in a rectangular cuboid.

The present invention relates to a novel method for the assembly of non-panel constructed furniture carcasses. It uses connectable box carcass framework members that simplify the construction of a furniture carcass in that there are minimal tools and skill required to produce a strong, dimensionally square, precisely sized, box that has a configuration that accepts an abundance of aesthetic and functional options, (by virtue of its orifice geometry and spacing) that are commercially available from a host of third party vendors. It is based on a pair of connectable structural vertical and horizontal members and alternate embodiments thereof. Essentially, any box caracass can be precisely fabricated to its exact design dimensions easily using this novel assembly method and the vertical and horizontal members disclosed herein. Such a box carcass will be strong enough that it will not structurally need to have a front or rear panel to retain its "squareness".

Prior art cabinet construction methods utilize side panels to form the structure of the cabinet box and also to provide the orifice patterns for shelves, doors and drawer slides. They also use rear panels to add the strength necessary to maintain the "squareness" of the carcass. Corner braces are the norm in prior art cabinetry construction. The present method uses connectable vertical and horizontal linear members to form the front and rear frames for the box carcass framework. There are two side panels, interior (structural) and exterior (aesthetic). Interior side panels serve only to dimension (add depth) the cabinet and connect the front and rear assembled frames. Exterior side panels have no penetrations, rather are just dimensioned sections of planar sheet material used where the outside of the cabinet is visible. There is a void between the two side panels used for insulation or wiring. The vertical linear members have three patterned series of orifices sized and spaced so as to accommodate shelves, doors and drawer slides as well as mechanical fastening members for construction of the frames. With linear voids running the length of both the vertical and horizontal linear members, low voltage wires and lighting may be securely and safely installed in a cabinet. This style of cabinet construction is novel in the field.

This method of box carcass assembly has its novelty not in the finished product, but rather in its semi-finished cabinet carcass assembly method.

The box carcass is the bare bones starting point (skeleton) for a plethora of different articles of furniture. The possibilities of different types of furniture are endless, limited only by the designer's imagination. The design of the vertical and horizontal rails are such that the orifice locations will align with the mechanical connector locations of the most common cabinet and furniture accessories so as to allow their seamless integration into the box carcass. Although just a glimpse of the various pieces of furniture able to be fabricated with this method are presented herein, they are not the focus of the invention. It is the method of box carcass assembly based on the novelty of the structural elements of the box carcass that is.

Figure 2:
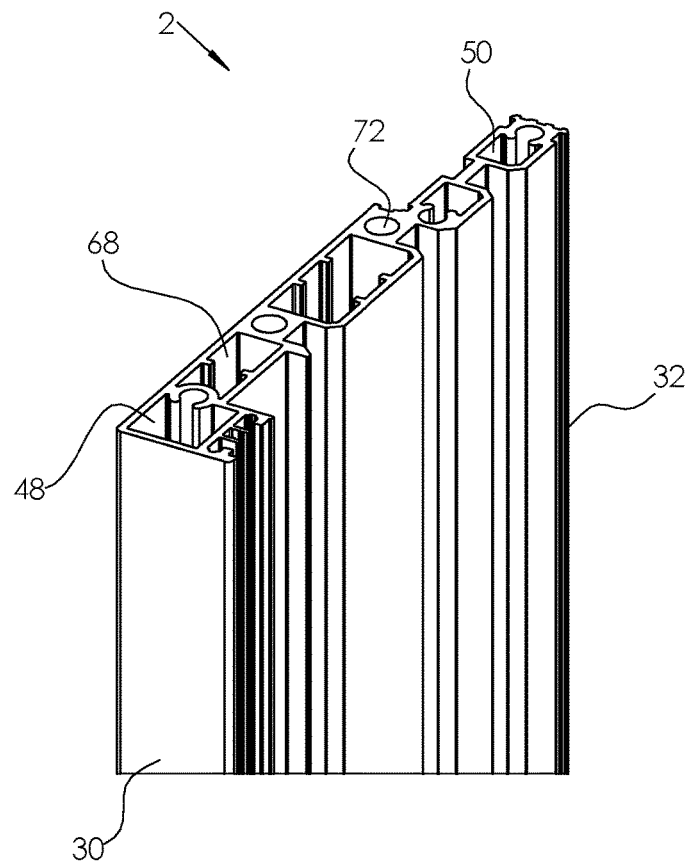
FIG. 2 is a perspective side view of a vertical member.
Figure 3:
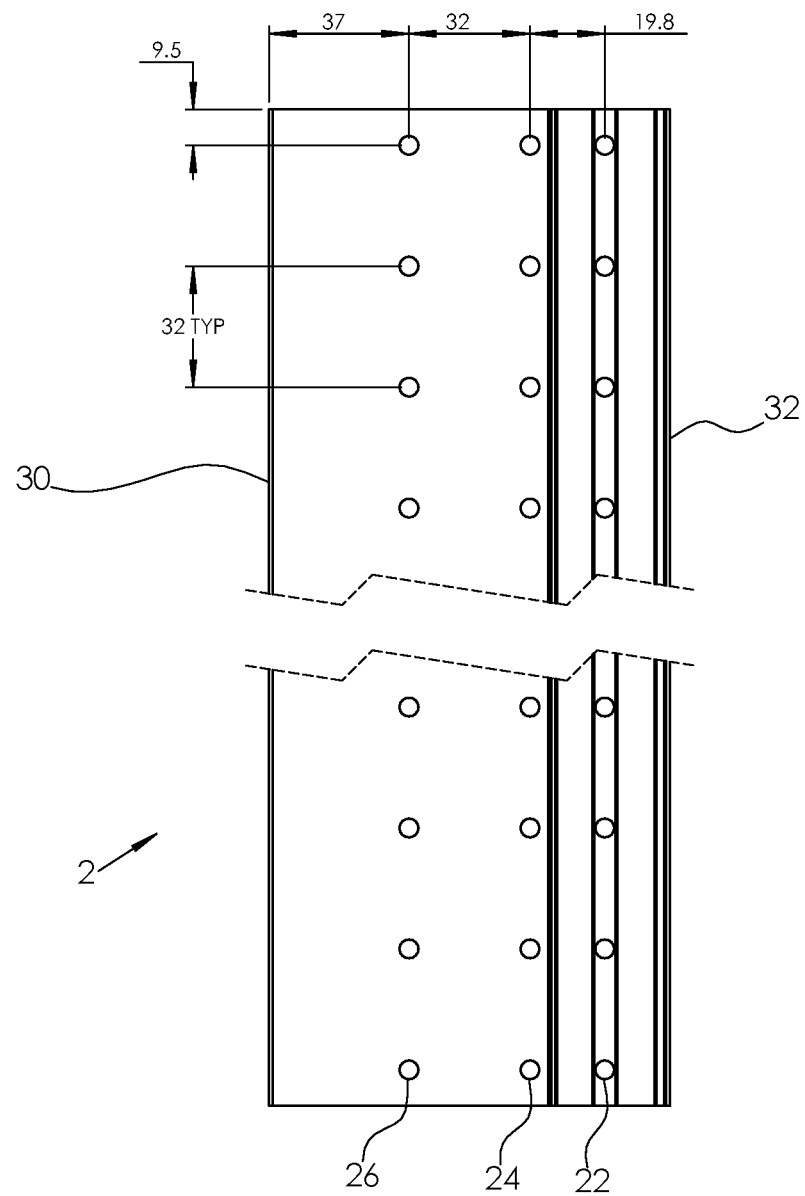
FIG. 3 is a side view of the inner face of a vertical member.

Looking at FIGS. 1, 2 and 3 the vertical member (also called a front vertical member) 2 can best be seen, The vertical member 2 is an extruded aluminum linear member having a series of different parallel profiles and configurations formed thereon its inner side 4 and its exterior side 8, running along its linear axis. It has a distal end 30 and a proximal end 32 each cut perpendicular to its linear axis. The inner side 4 is generally planar with a rabbet 6 formed along one entire linear edge. (An edge running parallel to the linear axis of the vertical member 2.) The rabbet 6 is for the attachment of a structural inner panel, and has depth of approximately ¼ inch which is a dimension that substrate goods in wood, metal, polymers can be readily found in. The exterior side 8 has first, second and third beveled exterior open channels 10, 12 and 14 running the entire length of the vertical member 2 and lying parallel to each other and the linear axis of the vertical member 2. These exterior open channels 10, 12 and 14 have an outer, top beveled edge 16 so as to accommodate the beveled head of a screw or equivalent mechanical fastener such that it resides even with or slightly below the top of the exterior side 8 when operatively connected between the vertical member 2 and the horizontal member 20 when assembled to make a front frame.

Figure 10:
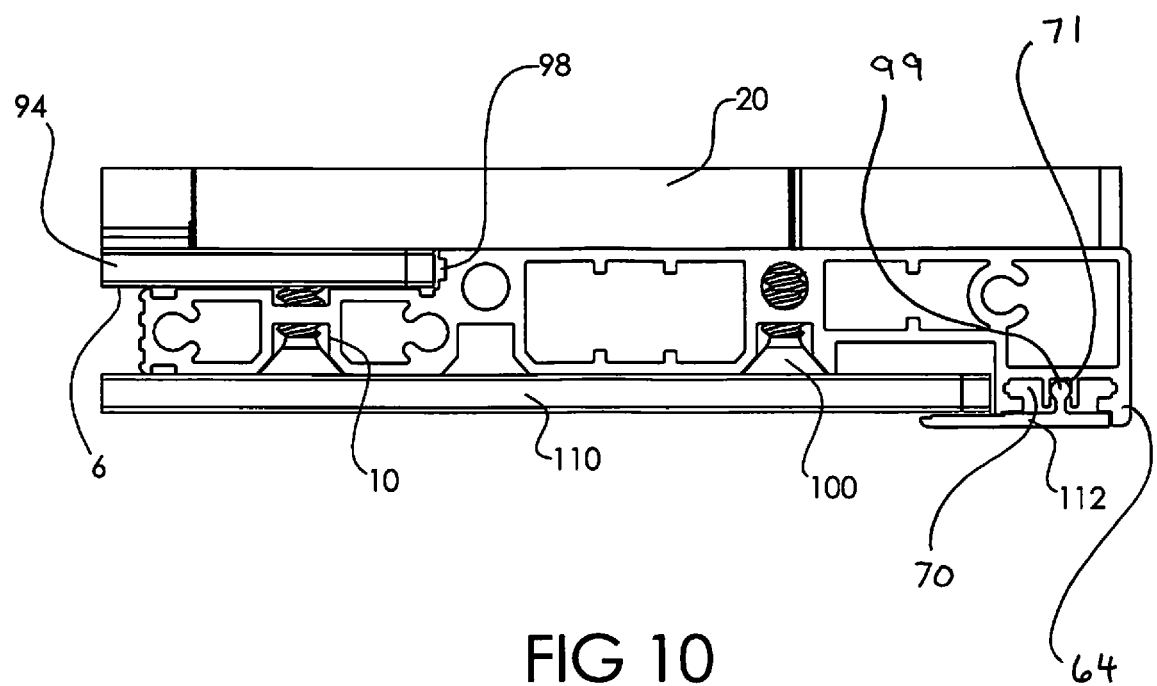
FIG. 10 is a top view of an assembled frame left front corner with snap cover.

There is a first zipper channel 64 formed on the exterior face 8 adjacent the distal end 30 of the vertical member 2. The zipper channel 64 can best be seen in FIGS. 10 and 11. This zipper channel 64 has a significant role in the finished aesthetics of 64 has two mirror image, "L" shaped dados 70 formed therein and separated by a centrally positioned "U" shaped dado 71 there between. The walls of the dado are tapered inward, narrowing from the top to the bottom of the dado. This physical configuration allows for the sliding engagement and interlocking of a host of matingly conformed structural and aesthetic linear members as will be discussed further herein. It is important to note that the first zipper channel 64 extends above the plane of the remainder of the exterior side by ¼ inch. This allows the flush attachment of a ¼ inch thick exterior aesthetic panel, to be discussed herein.

The first, second and third beveled channels, 12 and 14 are not spaced equidistant from each other. There are first, second and third linear series of orifices 22 24 and 26 that lie along the centerline of their respective beveled channels 10, 12 and 14. The orifices in each linear series are equally spaced from all of the adjacent orifices within their series. These orifices suit two purposes. First, they are construction orifices for the structural connection of various elements (such as inner structural panels) via the appropriate mechanical fasteners. Second, they are system attachment orifices for the attachment of commonly available cabinet components such as shelves, doors and the like. For this reason, these series of orifices are typically, but not always, sized and spaced in conformance with the industry standard dimensions for cabinet componentry.

It is to be noted that in alternate embodiments (not illustrated) there may not be the three beveled open channels. Rather, the first, second and third linear series of orifices 22, 24 and 26 may be formed with beveled edges narrowing or tapering inward from the exterior side 8 toward the inner side 4. This would allow the tapered heads of the mechanical fasteners (preferably screws) to reside below the face of the exterior side 8. It is to be noted that this configuration, without the three beveled open channels 10, 12 and 14 will lose some of the rigidity of the vertical member 2 as compared to one with these three stiffening channels.

Approximately centered in, and lying parallel to the linear axis along the vertical member 2 is a central linear void 42 that that serves to stiffen the vertical member 2 and provide a wiring chase. It has four linear strengthening ribs 44 formed there along its entire inner face. There are no orifices into this central channel 44 so that there will not be the inadvertent intrusion of a mechanical fastener that could cause electrical issues.

There are a total of seven linear voids in between the distal and proximal ends 30 and 32 and the inner and exterior sides 4 and 8. Three of these voids have walls that form "C" shaped screw busses 46 that provide a structural component for the retention of the threaded end of a mechanical fastener, thus allowing countertops, lids, bottom plates and the like to be mechanically attached to the cabinet to form a top and bottom face. One of these screw busses 46 is formed in the distal end void 48 adjacent the distal end 30 and one of these screw busses 46 is formed in the proximal end void 50 adjacent the proximal end 32 of the vertical member 2. The remaining screw buss is formed on the wall of a void located there between the distal end void 48 and the proximal end void 50. There is a rectangular void with two stiffening ribs formed thereon that abuts the distal end void 48. The remaining two voids are cylindrical voids 72 that prevent shelf pins from tilting when inserted though the orifices. In alternate embodiments this void may be a soldid with a thicker wall.

It is to be noted that the "C" shaped screw busses extend the entire length of the vertical member and have an open slot formed there along to allow the channel to expand, yet still tightly grip the thread of a screw.

Looking at FIG. 3 the preferred dimensions of the first second and third linear series of orifices 22, 24 and 26 can best be explained. These do not differ between the vertical member 2 and the back vertical member 40. Each linear series of orifices has its highest orifice (a construction orifice) located at 9.5 mm from the top end of a vertical member. Each linear series of orifices has its lowest orifice (a construction orifice) centered at 9.5 mm from the bottom end of a vertical member. This spacing is used as it is it is half of the industry's prevalent top structural panel thickness of 19 mm. Thus, the 9.5 mm centers mechanical fasteners therein the panel and also positions the top of the structural panel flush with the top of a vertical member.

Other dimensions could be used, as the industry has multiple standards; in general the top [first and bottom [last] orifices shall be spaced one half of the horizontal member's thickness from the ends of the extrusions.

All subsequent orifices in each linear series are system attachment orifices and are 32 mm apart, center-to-center. The third linear series of orifices 26 is vertically centered at 37 mm from the distal end 30 of a vertical member. The second linear series of orifices 24 is vertically centered 32 mm from the vertical center of the third linear series of orifices 26 (or 69 mm from the distal end of a vertical member). The first linear series of orifices 22 is vertically centered 19.8 mm mm from the vertical center of the second linear series of orifices 24 (or 88.8 mm from the distal end of a vertical member). These dimensions too may vary as there are several other standards such as 20 mm, 25 mm and 40 mm, as well as future custom sizes.

It is to be noted that construction orifices and system attachment orifices differ only in their spacing from the distal and proximal ends of a vertical member. A vertical member may be cut perpendicular to its linear axis between any adjacent orifices so as to create the proper construction orifice spacing of 9.5 mm from the distal and proximal edges of a vertical member to the center of the orifice.

It is also to be noted that while the preferred embodiment orifice spacing dimensions are based around the most prevalent industry system dimensions, there are other systems with different dimensions, such as 25 mm, 40 mm and 20 mm for instance, that a vertical members could be dimensioned to.

Figure 4:
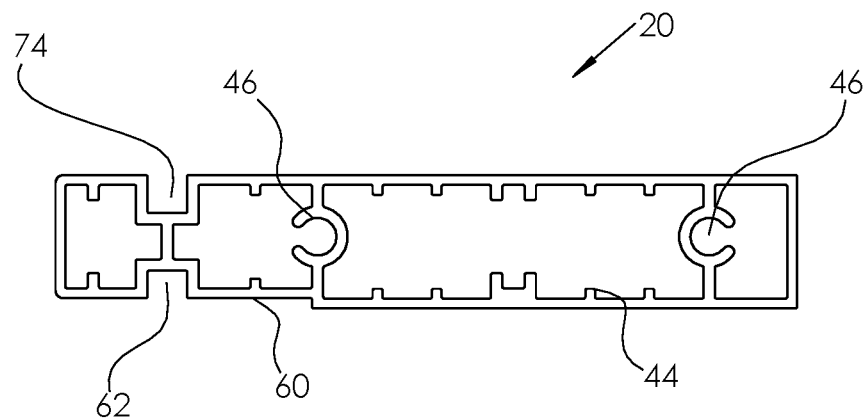
FIG. 4 is an end view of a horizontal member.
Figure 5:
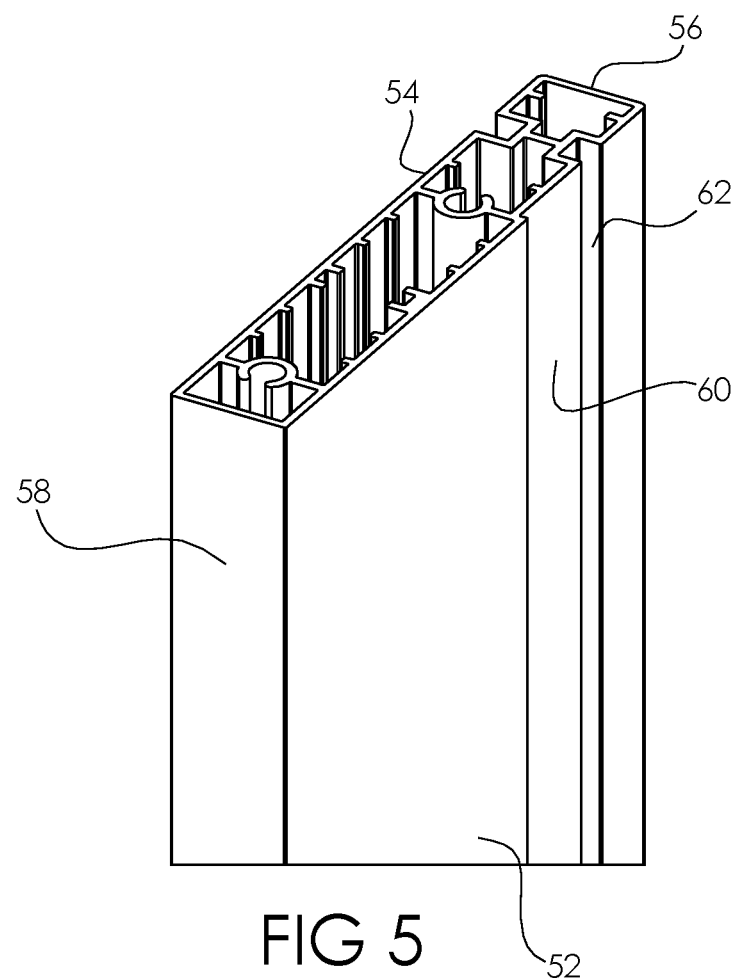
FIG. 5 is a perspective side view of a horizontal member.

The horizontal member 20 is an aluminum linear extrusion having an exterior face 54, and interior face 52 a distal end 56 and a proximal end 58 as can be seen in FIGS. 4 and 5. The proximal and distal ends are cut perpendicular to the linear axis. It is symmetrical about its centerline when viewed in an axial cross section. Its proximal end 56 has a rabbet 60 formed there along running parallel to the linear axis of the horizontal member. The rabbet has depth of approximately ¼ inch which is a dimension that substrate goods in wood, metal, polymers can be readily found in. It can accommodate double sided tape to hold the lip of the pan that goes over the extrusion down. It has four linear voids formed therein. The largest linear void has eight stiffening ribs 44 formed thereon its inner side walls and two "C" shaped screw busses 46 (similar to those found in the first vertical member 2) formed on its end walls. This void serves to stiffen the horizontal member 20 and to serve as a horizontal wire chase. The voids are also spaced in such a way that four of the ribs can hold an insert made of 12 gauge steel to greatly stiffen the extrusion and thus increasing its weight capacity as a shelf. The screw busses 46 are spaced so as to align with orifices from the first and third linear series of orifices 22 and 26. Along the exterior face 52 adjacent the proximal end 56 is formed a rabbet 60, having a depth of ¼ inch, to accommodate the metal pan. There is also an exterior dado 62 formed along the length of the rabbet 60. There is an interior dado 74 formed along the interior face 52 running parallel to the exterior dado 62.

The method of assembling a box carcass is disclosed below. For illustrative purposes the assembly method for a base (most simplistic) carcass will be detailed. Such a carcass uses the horizontal and vertical members 20 and 2 discussed herein, and has no back panel, top panel or bottom panel and uses identical front and rear frames 80. (It does not incorporate a back linear horizontal member 40.) It is to be noted that the vertical members 2 may be used to make a box carcass without the horizontal member 20 by substituting any planar substrate or linear member of sufficient thickness and strength to maintain squareness, such as plywood or a spring pin. The method of adding some of the most common optional cabinet members will be discussed, hereafter.

Figure 20:
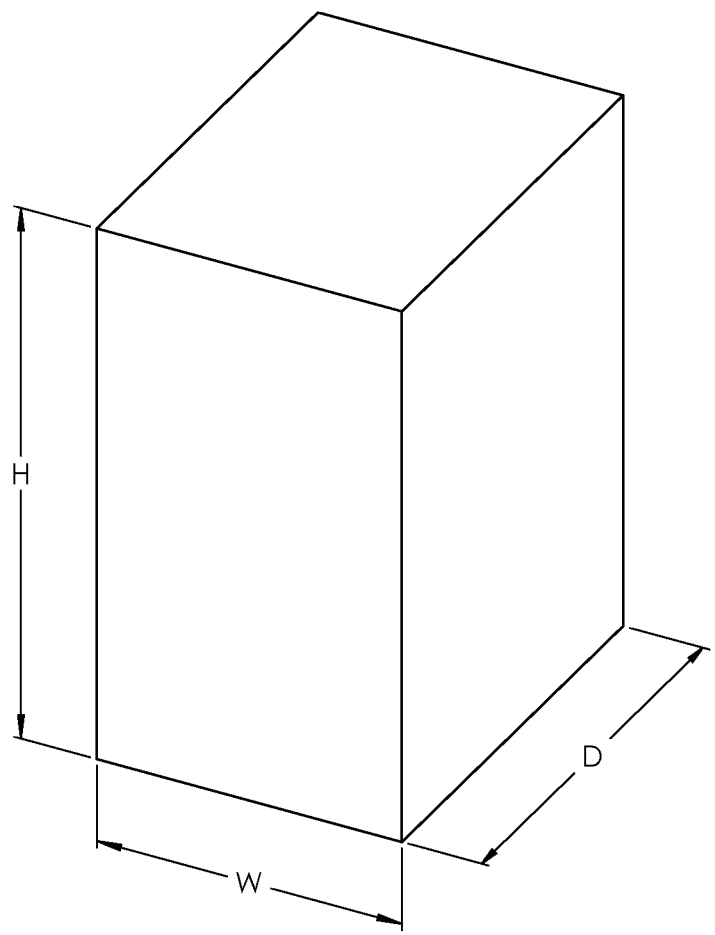
FIG. 20 is a perspective view of a three dimensional box establishing the reference dimensions designations.
Figure 21:
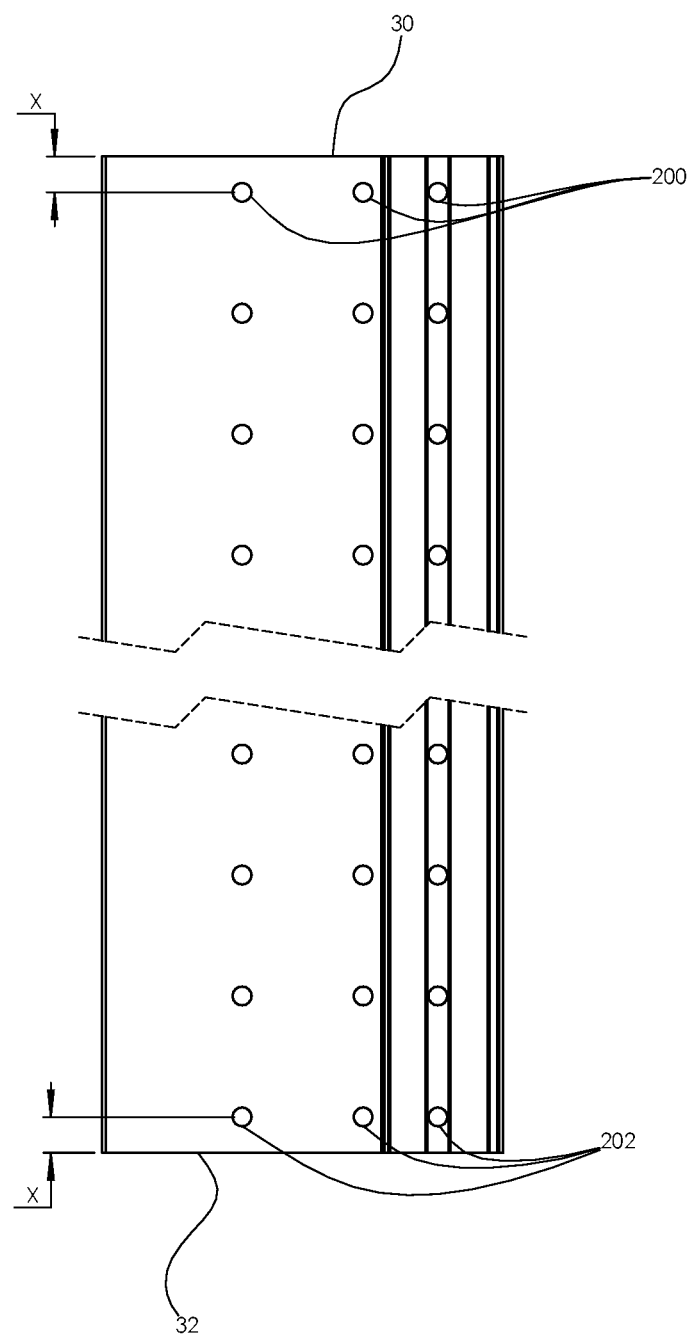
FIG. 21 is an exterior side view of a first vertical member.
Figure 22:
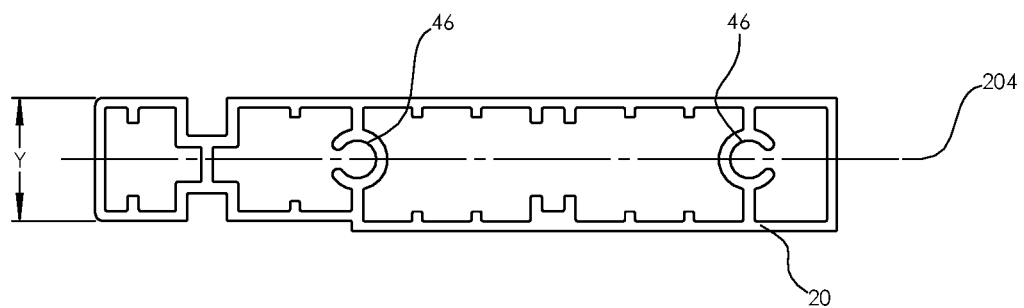
FIG. 22 is an end view of a horizontal member.

First, the finished height, width and depth dimensions of the finished box carcass are determined. These are designated H, W and D on FIG. 20. Four first vertical members 2 will be cut at their proximal ends 30 and distal ends 32 to a length equal to the finished box carcass height (H). The location of the highest orifices 200 and the lowest orifices 202 in all the first, second and third beveled exterior open channels 10, 12 and 14 of the vertical member 2 are critical to this assembly. (FIG. 21). The centers of these orifices must be at a distance X from the proximal ends 30 and distal ends 32 of the vertical member 2 so as to align with the centerline 204 of the horizontal member 20. (FIG. 22) This distance X will be ½ of the thickness Y of the horizontal member 20. In this way, mechanical fasteners (preferably screws with tapered heads having a height shorter than or equal to that of the depth of the beveled section of the beveled exterior open channels 10, 12 and 14) will pass through the orifices 200 and 202 in the first and third beveled exterior open channels 10 and 14 in perfect alignment with the screw busses 46 of the horizontal member for connection of the vertical members 2 and horizontal members 20 into a frame 80. (Or alternatively frame 82 if the back vertical linear member 40 is substituted for the vertical member 2 on one of the frames.) (In the case where the box carcass is being assembled without the horizontal member 20, say with a rectangular planar panel of ¾" plywood substituted, the distance X would be one half of that thickness or here, ⅜".)

In cutting the vertical member 2 for the box carcass height H, one end of the vertical member 2, either the distal end 32 or proximal end 30, must be cut such that the distance from that first cut end to the center of the first orifices (lowest orifices or highest orifices) is equal to one half of the thickness of the horizontal member X. (FIG. 22) The overall length of the vertical member 2 may then be cut. If the distance from that second cut end to the center of the other end first orifices (lowest orifices or highest orifices) is not equal to one half of the thickness of the horizontal member (X), then orifices must be drilled in the first and third open beveled channels such that the distance from their center to the end of the vertical member 2 equals one half of the thickness of the horizontal member X. (Note that the existing first, second and third linear series of orifices 22 24 and 26 are spaced vertically so as to eliminate the later half of this step for common dimensioned cabinet heights, such as that of kitchen cabinets.)

Figure 23:
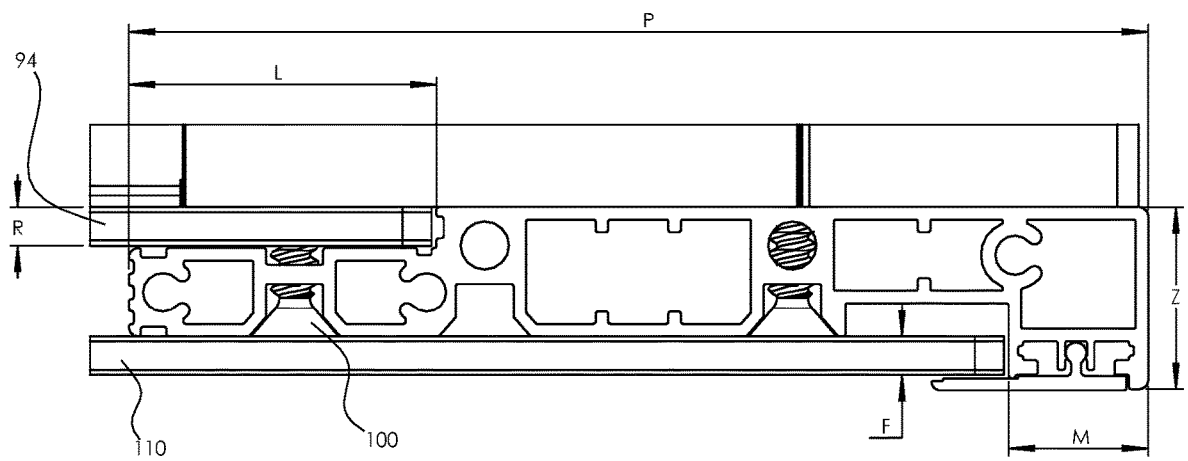
FIG. 23 is an top corner view of an assembled box carcass.

The horizontal members 20 are cut such that their length between their distal ends 56 and proximal ends 58 is equal to the designated width W of the of the finished box carcass minus two times the thickness Z of the vertical members 2. (FIG. 23). This will position the two identical frames 80 at the correct width W for the box carcass.

The two structural (inner) side panels 94 are cut into a rectangular shape having a height of the box carcass height H and a depth that of the box carcass width D minus two times the width P of the first vertical member 2 plus two times the width L of the rabbet 6 on the first vertical member 2. The thickness of the inner panel 94 will be that of the depth R of the rabbet on the edge of the first vertical member 2. (This is ¼" in the preferred embodiment.)

Each cabinet requires a front frame 80 and a rear frame 82 (See FIG. 19) These frames are denoted by their location in the cabinet. These frames may be identical as in the base carcass or different structurally, based on the type of vertical members used to make the frame. (An alternate embodiment back vertical member 40 may be used in place of the vertical member 2 to make a rear frame where connection along the rear side of the finished cabinet, or a back panel is desired, as previously disclosed.)

Here, each frame is constructed of two identical vertical members 2 and two identical horizontal members 20. Once cut as discussed above, the horizontal members 20 are positioned perpendicularly between the vertical members 2, one horizontal member 20 spanning between the distal ends 32 of the two vertical members 2 and one horizontal member 20 spanning between the proximal ends 30 of the two vertical members 2. The screw busses 46 of the horizontal members 29 are aligned with orifices from the first and third linear series of orifices 22 and 26 in the vertical members 2.

Tapered head screws are passed through the orifices from the first linear series of orifices 22 from the first beveled channel 10. The tapered screws are used to threadingly engage the screw busses 46, drawing the straight distal ends 56 and proximal ends 58 ends of the horizontal members 20 into firm contact with the internal face 4 of the vertical member 2 so as to make a two front frames 80 that are a solid rectangle.

Figure 8:
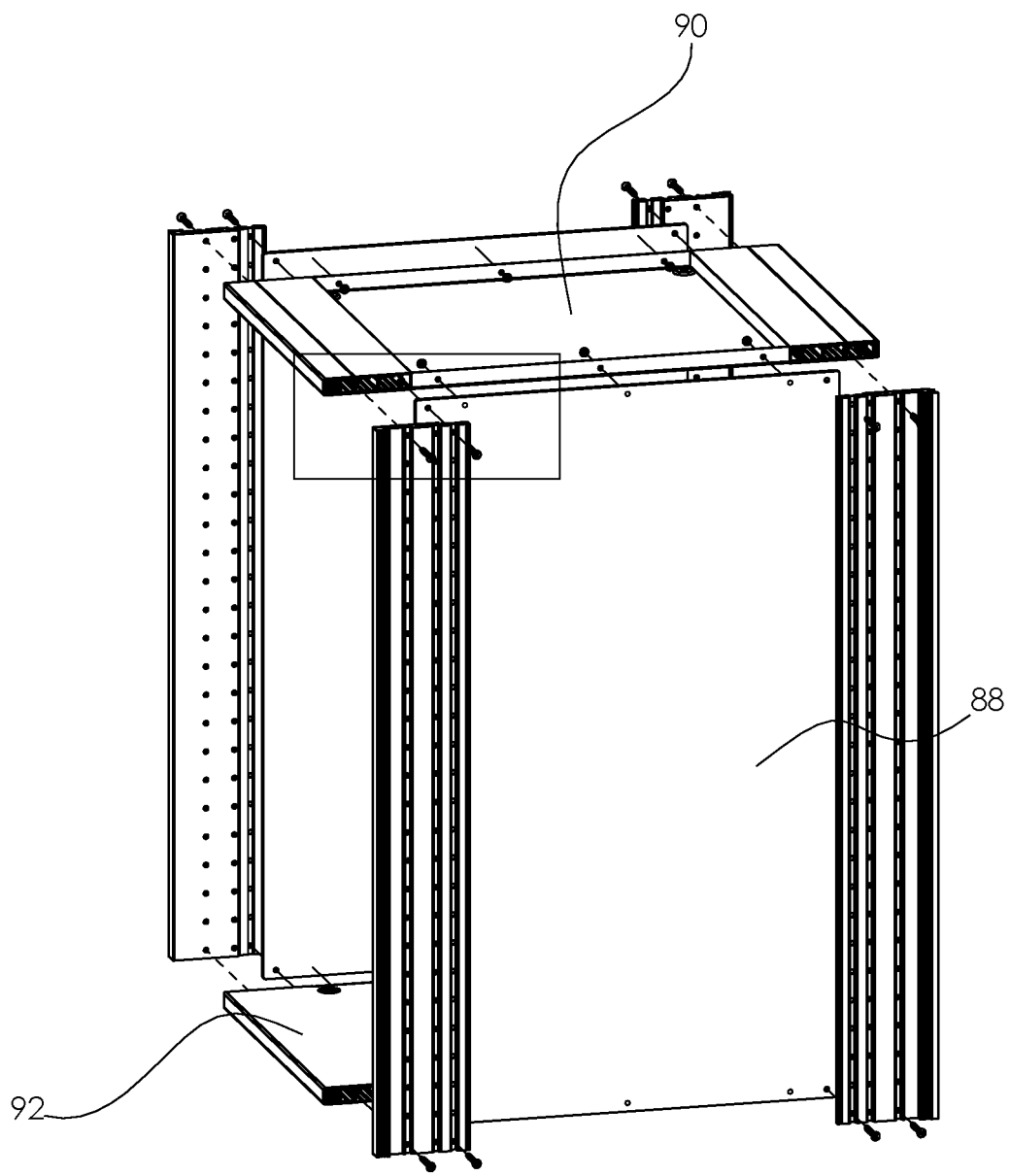
FIG. 8 is an exploded perspective view of an assembled carcass.

With the identical front and rear frames assembled, looking at FIG. 8 it can be seen that the construction of the base carcass requires these two identical frames to be joined in mirror image configurations.

Figure 9:
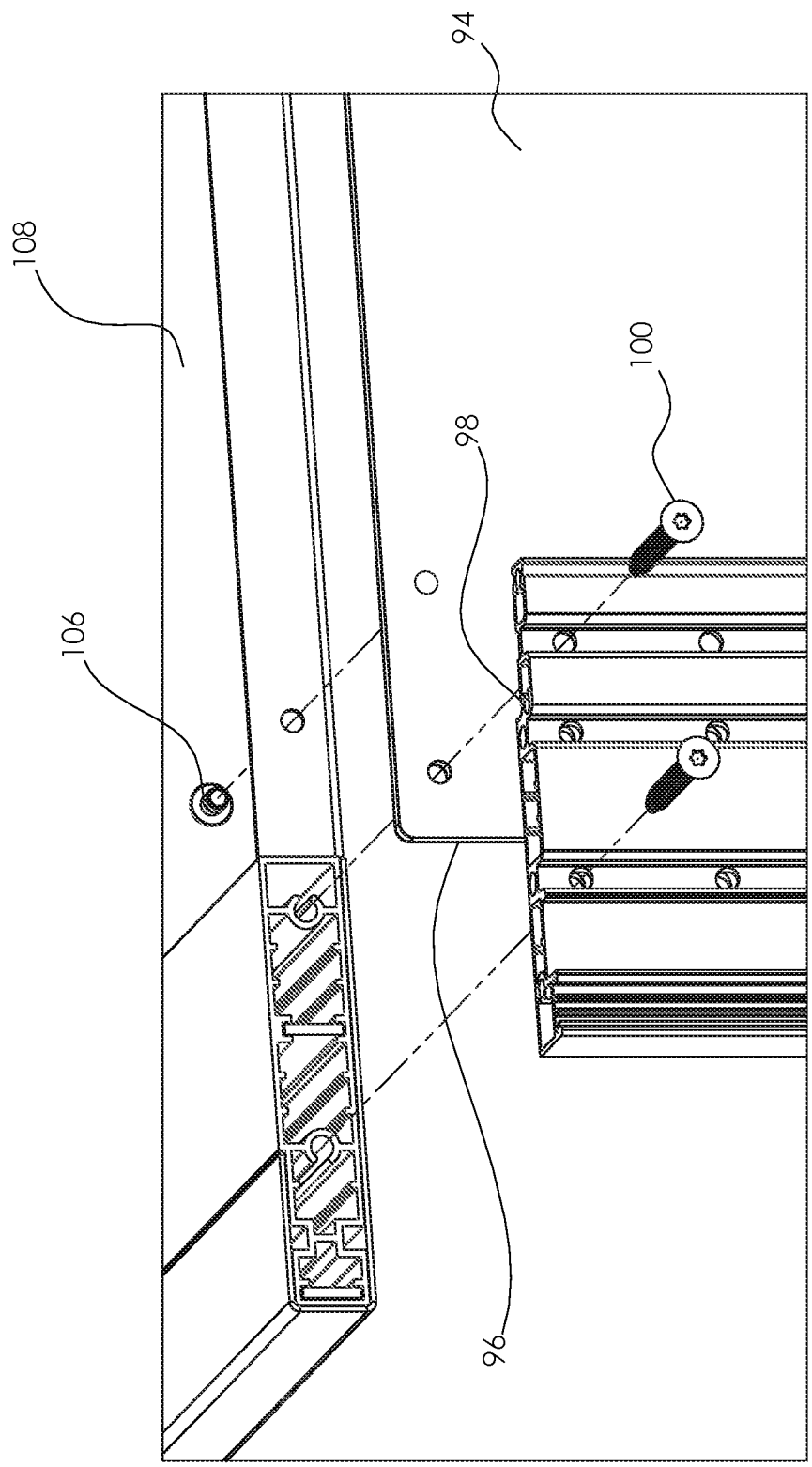
FIG. 9 is an assembly view of the front frame corner of the assembled carcass of FIG. 8.

In construction of a cabinet as shown in FIG. 9, it can be seen that prior to the assembly of the first vertical member 2 and the horizontal member 20, an approximately ¼ inch thick rectangular planar panel 94 is cut for the specific height and depth dimensions of the cabinet.

With the frames positioned such that they are in opposition to each other or are mirror images of each other about a vertical plane passing through the center of the cabinet, the first of the side panels 94 is aligned with part of its interior face lying in contact with each of the rabbets 6 on the vertical members 2 and each of its vertical edges 96 contacting the lip 98 on inner edge of the rabbets on the vertical members 2. This panel 94 is an inner structural panel as it is used to dimension the depth of the cabinet and stabilize the front and rear frames into the carcass of the cabinet. At each of the four corners, there is a first mechanical fastener 100 passing through the first exterior open channel 10, through the top orifice in the first linear series of orifices 22, through a corner orifice in the panel 94 and then threadingly engaged into the screw buss 46 formed on the end walls of the largest linear void in horizontal member 20. (The second mechanical fastener 100 passing through the third exterior open channel 14 and through the top orifice in the third linear series of orifices 26 then threadingly engaged into the other of the two screw busses 46 formed on the end walls of the largest linear void in horizontal member 20 was inserted in the previous step to make the alignment of the structural panel 94, the vertical member 2 and the horizontal member 20 easier. (See FIG. 10)

The second side panel 94 is dimensioned the same size as the first side panel 94 and connected to the frames in the identical fashion as the first side panel 94 was. In this design, the panel 94 uses its edge contact with the rabbet lips as well as its frictional engagement between the first vertical panel 2 and the horizontal member 20 to hold the front frame 80 and the rear frame 82 into a spaced, square configuration defining the volume of the carcass. This along with the generous width of the vertical and horizontal members 2 and 20 imparts high rigidity to the entire carcass maintaining its "squareness".

This now forms a base box carcass of the simplest design. From this point on the ingenuity and simplicity of the method of assembly of a customized cabinet can best be illustrated.

Figure 6:
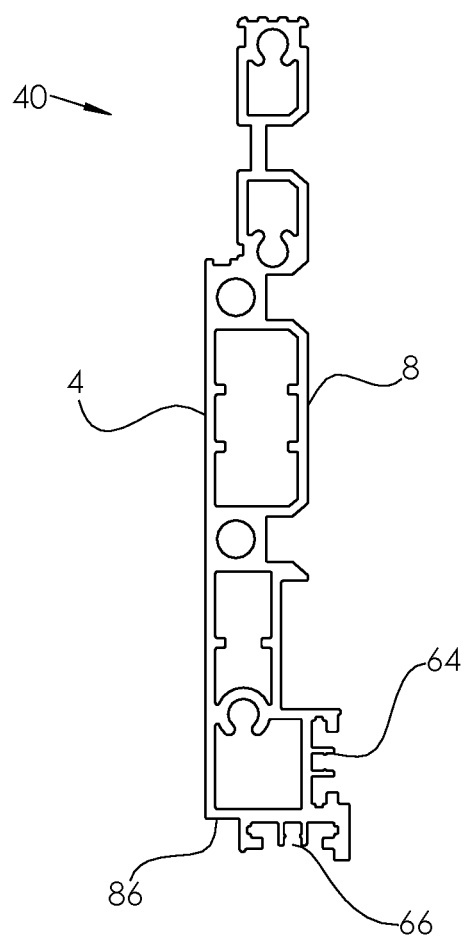
FIG. 6 is an end view of a rear vertical member.
Figure 7:
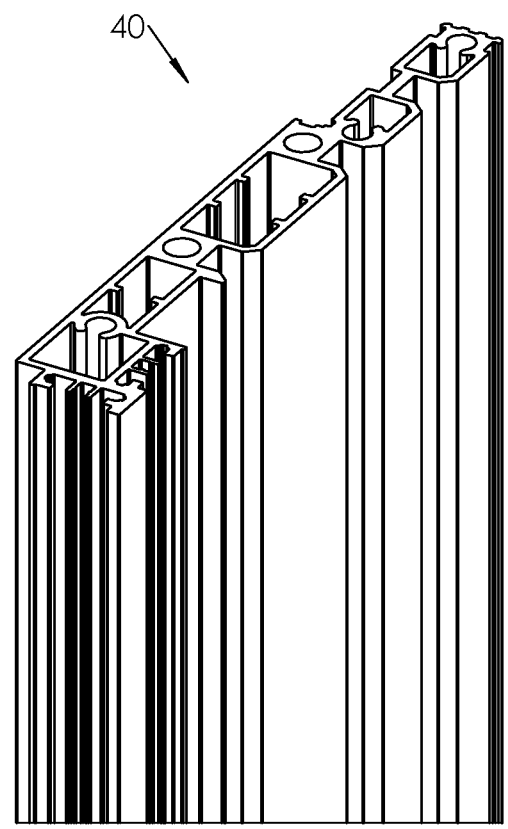
FIG. 7 is a perspective side view of a rear vertical member.
Figure 25:
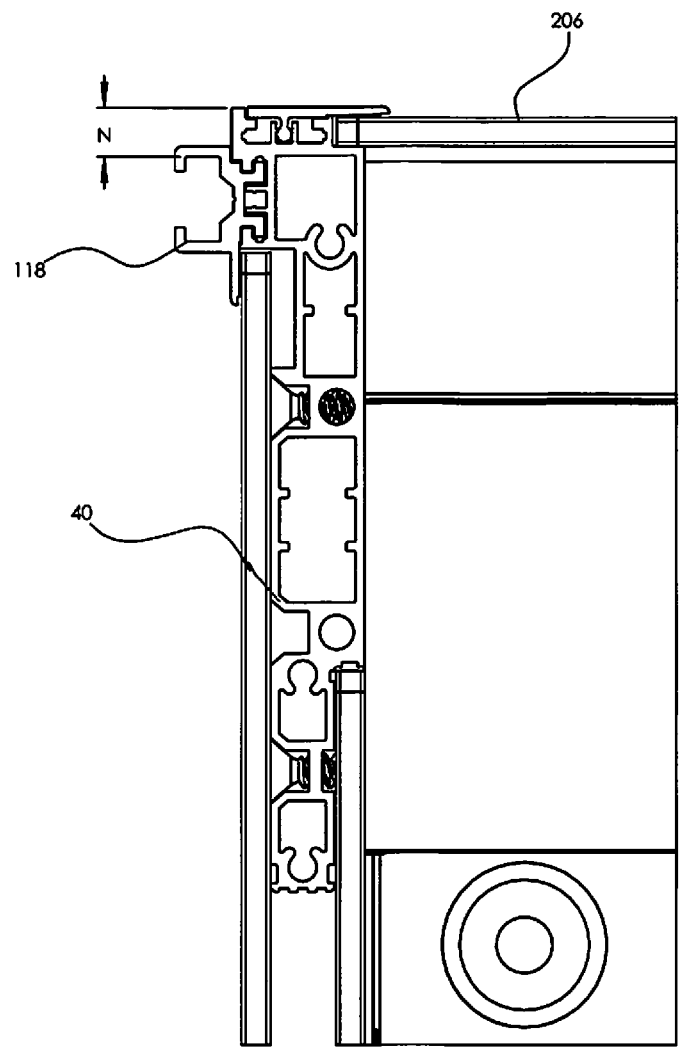
FIG. 25 is a top view of a box carcass with a back panel.

With the structural inner panel 94 attached, an outer aesthetic outer panel 110 may be added. The two aesthetic (outer) side panels 110 are cut into a rectangular shape having a height of the box carcass height H and a width that of the box carcass width W minus two times the width M of the zipper channel 64 on the vertical member 2. This outer panel 110 will have no penetrations. The thickness of the outer panel 110 will be that of the height F of the zipper channel 64 on the edge of the vertical member 2. (This is no less than 3 mm but no more than 1¼ thick in the preferred embodiment.) The outer panel 110 will be a laminate or solid of wood, steel, aluminum, polymer or any of a plethora of available planar materials. The outer panel 110 is placed with its vertical edges in abutment with the edges of the first zipper channels 64 and a snap cover 112 is slidingly engaged, or pounded in along the length of each of the first zipper channels 64. The snap cover 112 has an inner face that is matingly conformed to be received in the three dados in the first zipper channels 64, and has an edge that extends beyond the inner edge of the first zipper channel 64 so as to frictionally constrain the outer panel 110 firmly against the outer face of the vertical members 2.

Where a cabinet back is needed then there must be a rear frame that is different than the front frame. (FIG. 25) The difference between these is that the rear frame uses a back vertical member 40 as illustrated in FIGS. 6, 7 and 25. The back vertical member 40 is identical to the vertical member 2 except that it has a second zipper channel 66 formed along its distal end that resides perpendicular to and between its inner and outer faces 4 and 8 and the first zipper channel 64. This second zipper channel 66 extends beyond the proximal end 86 of the back vertical member 40 a distance of N (FIG. 25). Preferably this distance is ¼ inch. The second and first zipper channels are structurally and functionally equivalent, and have overlapping corners residing 90 degrees apart on the back vertical member 40. Here the rear frame utilizes a back vertical member 40 rather than a vertical member 2. Assembly of the frames and the side panels is identical to that described above. A back panel 206 is cut into a rectangular shape having a height of the box carcass height H and a width that of the box carcass width W minus two times the width M of the zipper channel 64 on the back vertical member 40. The thickness of the back panel 206 will be that of the height N of the second zipper channel 64 on the back edge of the back vertical member 40. (This is ¼" in the preferred embodiment.)

Figure 24:
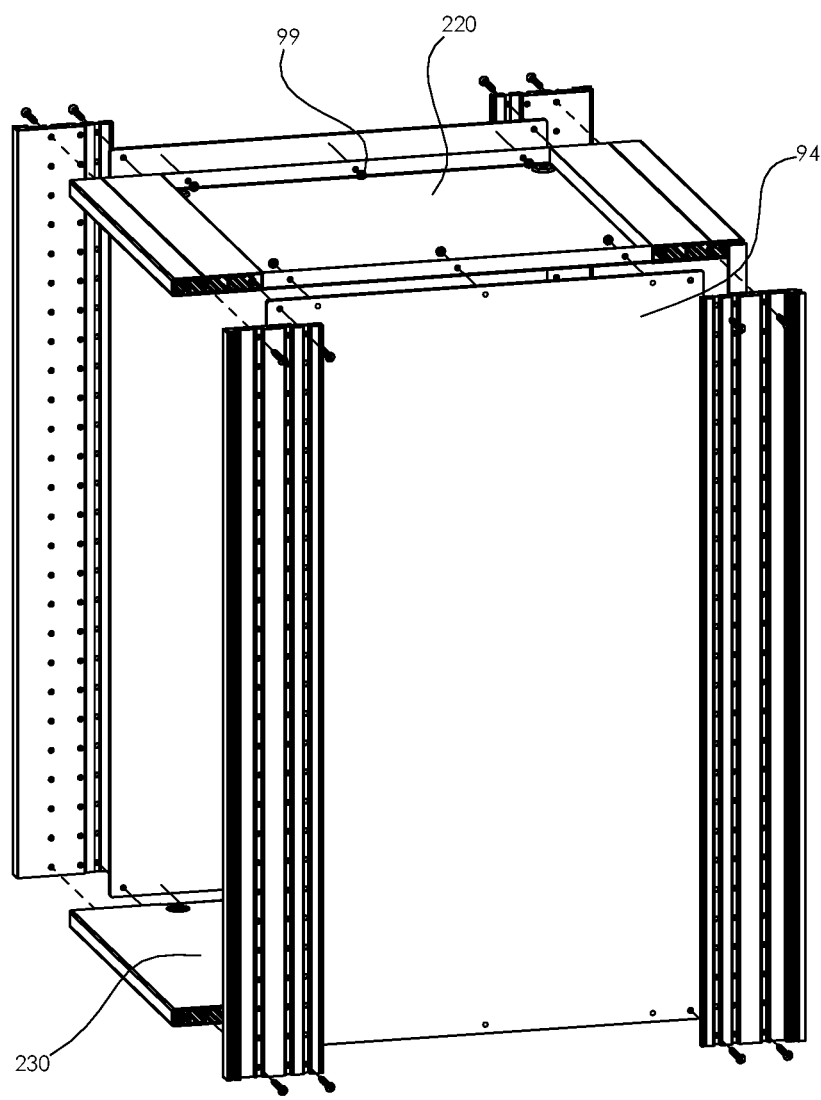
FIG. 24 is a perspective view of an exploded box carcass.

Top panels are generally not necessary in kitchen cabinet construction as there is a countertop affixed atop of the horizontal members 20. However where a top 220 is necessary an appropriately sized planar substrate that is dimensioned accordingly, may be placed between the horizontal members 20 and the two inner sides 94 and affixed with mechanical fasteners 99 (such as screws, bolts, pop rivets, adhesive strips or the equivalent) to the side panels. This would necessitate the drilling of additional orifices in the side panels 94. A bottom panel 230 may be added in a similar fashion. (FIG. 24)

As can be seen, using these three linear members and associated assembly method, numerous other designs are possible as virtually all cabinet accessories can be incorporated or adapted to be installed. Much of this is due to the zipper channels 64 or 68.

The functionality of the zipper channels 64 and 66 is identical regardless whether located along the exterior face of a vertical member adjacent its distal end (as on the vertical member 2 and back vertical member 40), or as located on the distal end of the back vertical member 40. They serve to allow the customizing of the cabinet by the insertion of various different matingly engageable strips (formed in cross section as bulbous protrusions or legs) that are slideably or poundingly connected there along the various channels in the zipper channel. Each of these matingly engageable strips have different configurations beyond their commonality of a minimum of two matingly engageable "L" shaped legs or a bulbous protrusion 99 extending from one of their faces.

Figure 11:
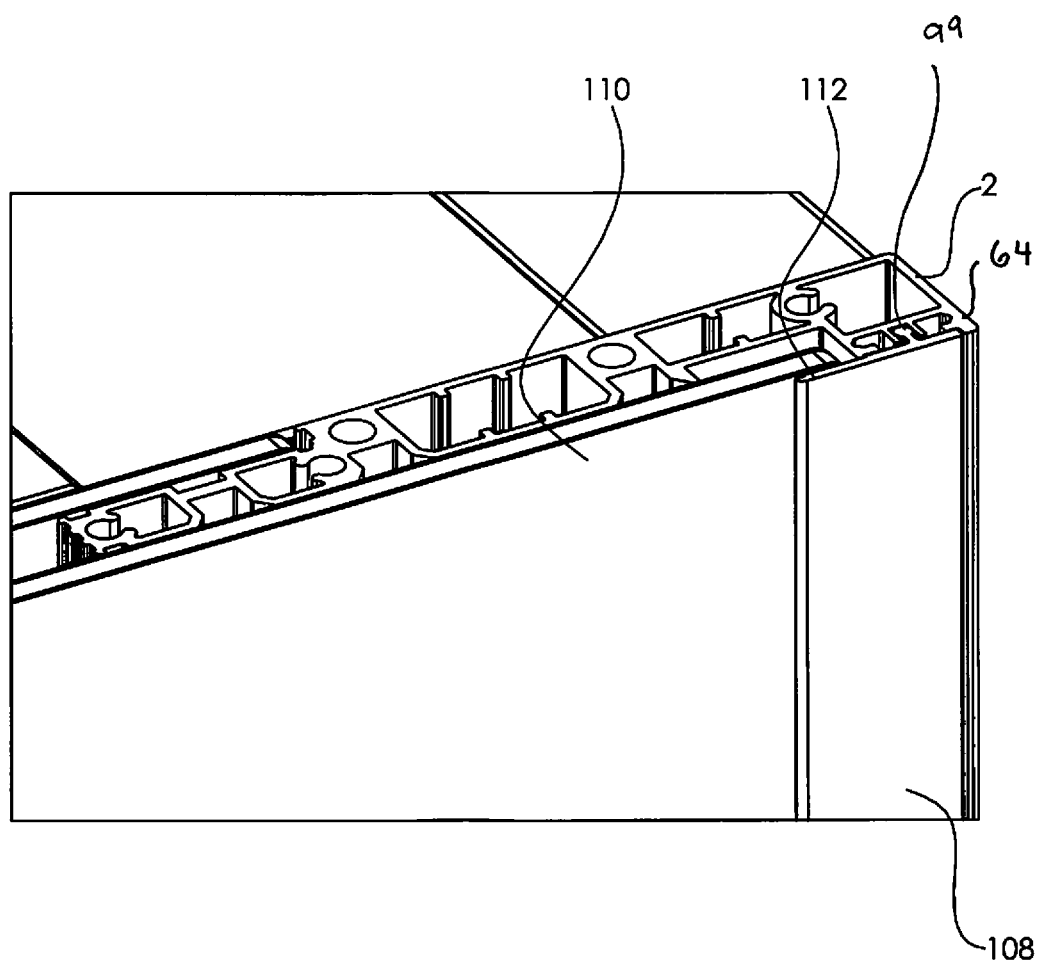
FIG. 11 is a perspective side view of an assembled frame left front corner with snap cover.

Looking at FIG. 11 a trim strip 108 can be seen engaged within a first vertical member 2 so as to allow the retention of an exterior, aesthetic panel 110 onto the outside of the cabinet. The trim strip has a panel lip 112 that extends normally from it so as to constrain the edge of a panel along its vertical linear edges. As in all dimensioning of the system components, when the trim strip 108 is engaged with either of the zipper channels, (by insertion of the bulbous protrusion 99 into the centrally located U shaped dado 71) the panel lip 112 resides approximately ¼ inch above the exterior face of the linear member 2 for compatibility of ¼ inch thick planar substrates.

Figure 12:
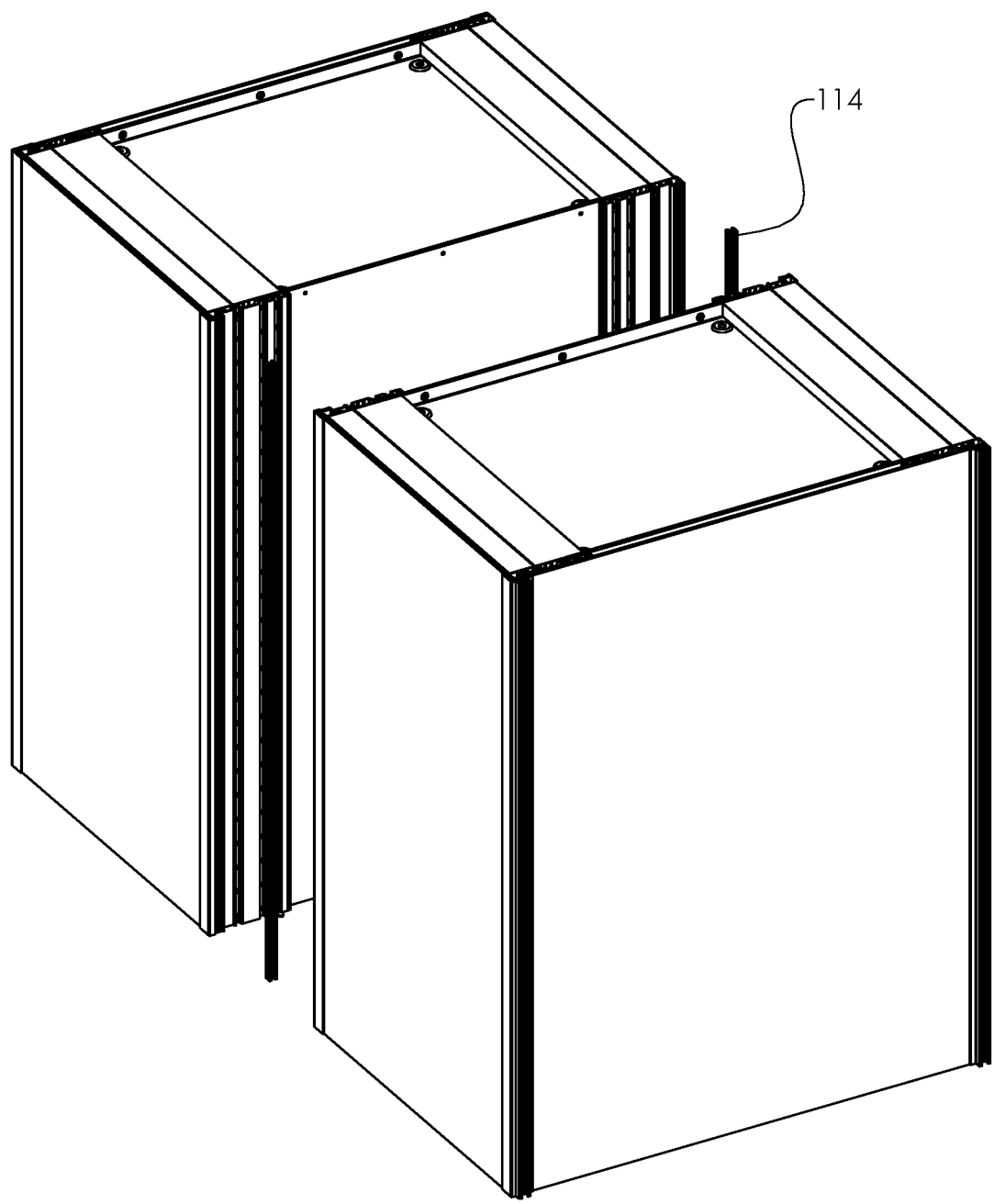
FIG. 12 is a perspective view of two assembled carcasses being joined side to side.
Figure 13:
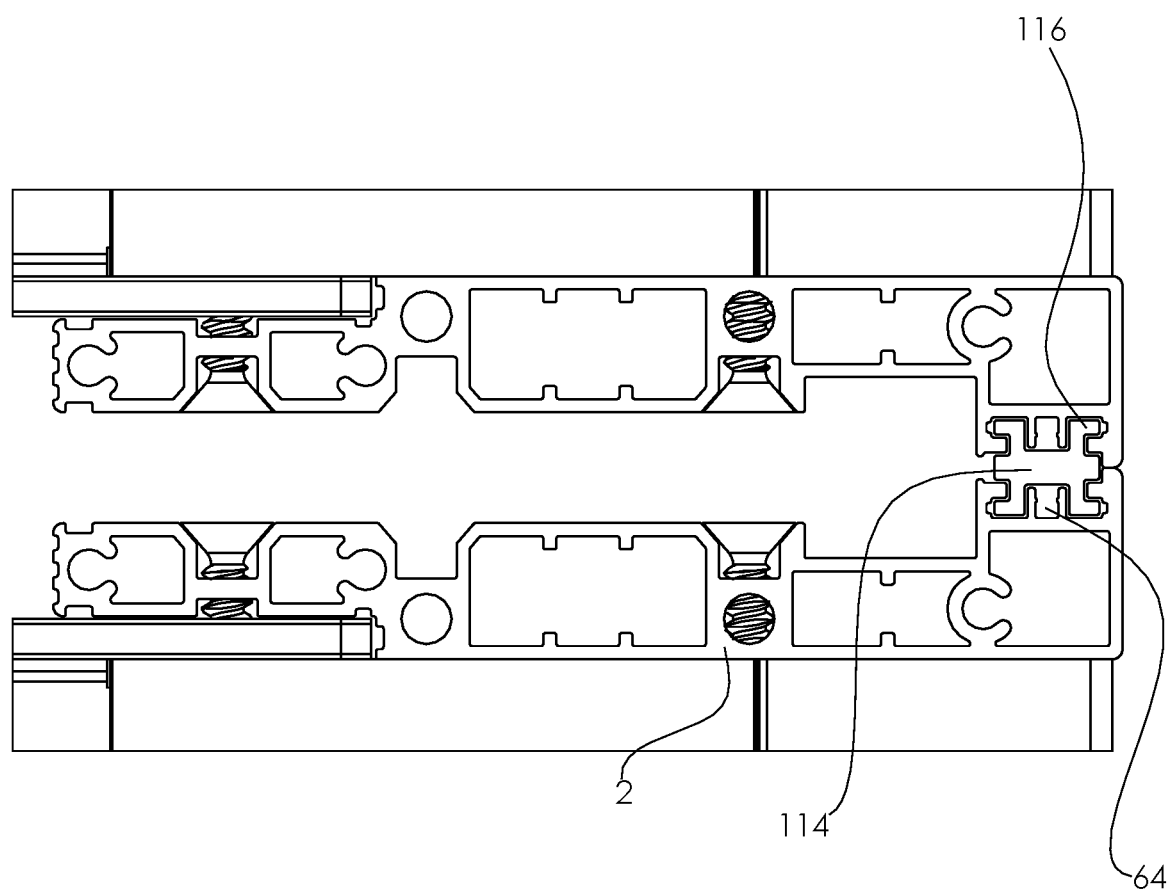
FIG. 13 is a top view of one of the joined corners of FIG. 12.
Figure 14:
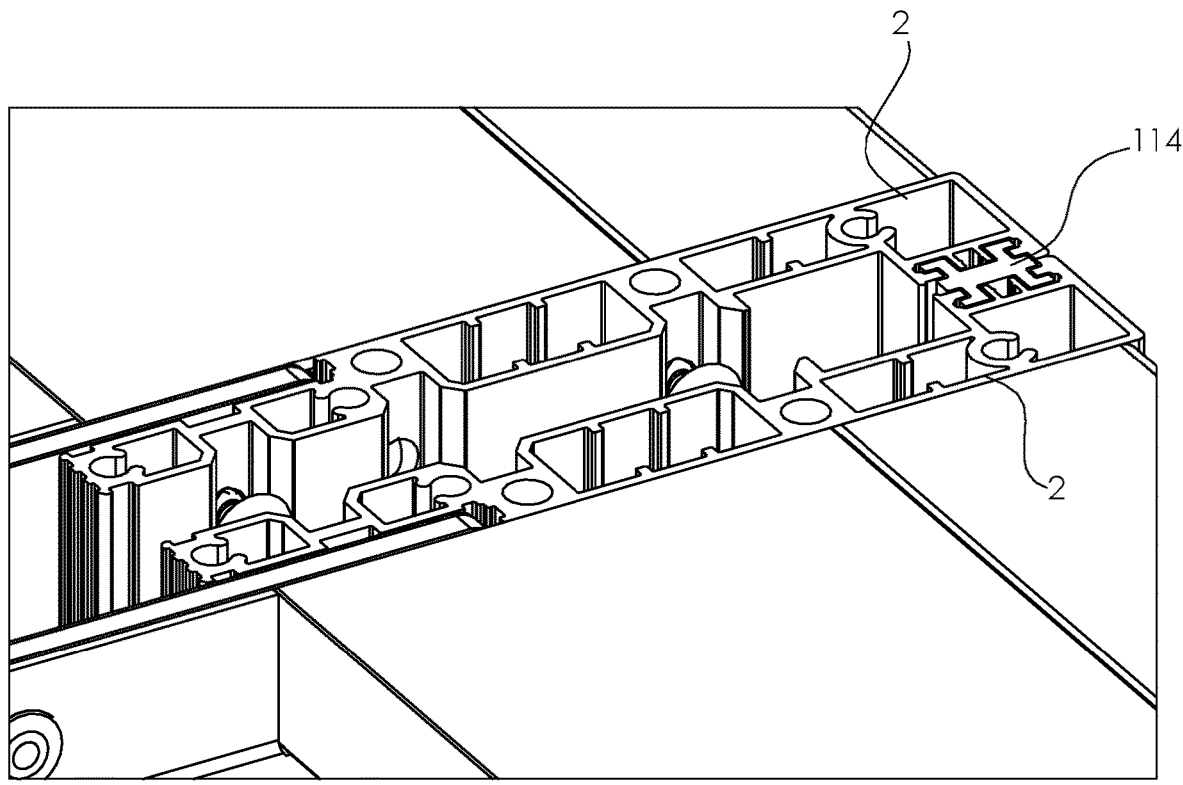
FIG. 14 is a perspective side view of one of the corners of FIG. 12.

Looking at FIGS. 13 and 14 a mullion strip 114 with four "L" shaped legs 116 can be seen engaged in the first zipper channels 64 of two first vertical members 2 on two cabinets to be joined side by side. It is to be noted that in this configuration the use of an exterior panel is optional. Since the second vertical member 40 has the additional second zipper channel 66, cabinets can be joined side to side (see FIG. 12) or back to back or back to side.

Figure 15:
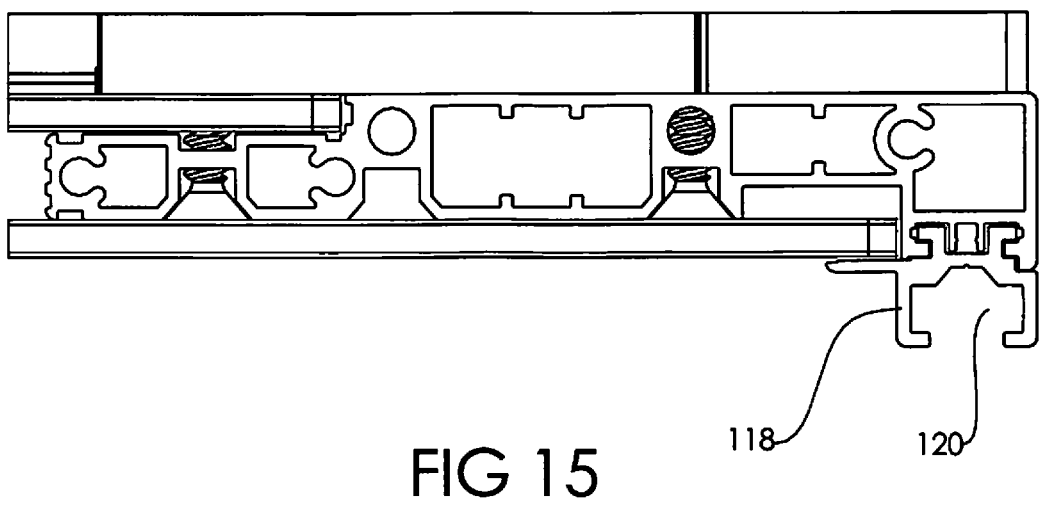
FIG. 15 is a top view of a carcass corner with a hanger channel.
Figure 16:
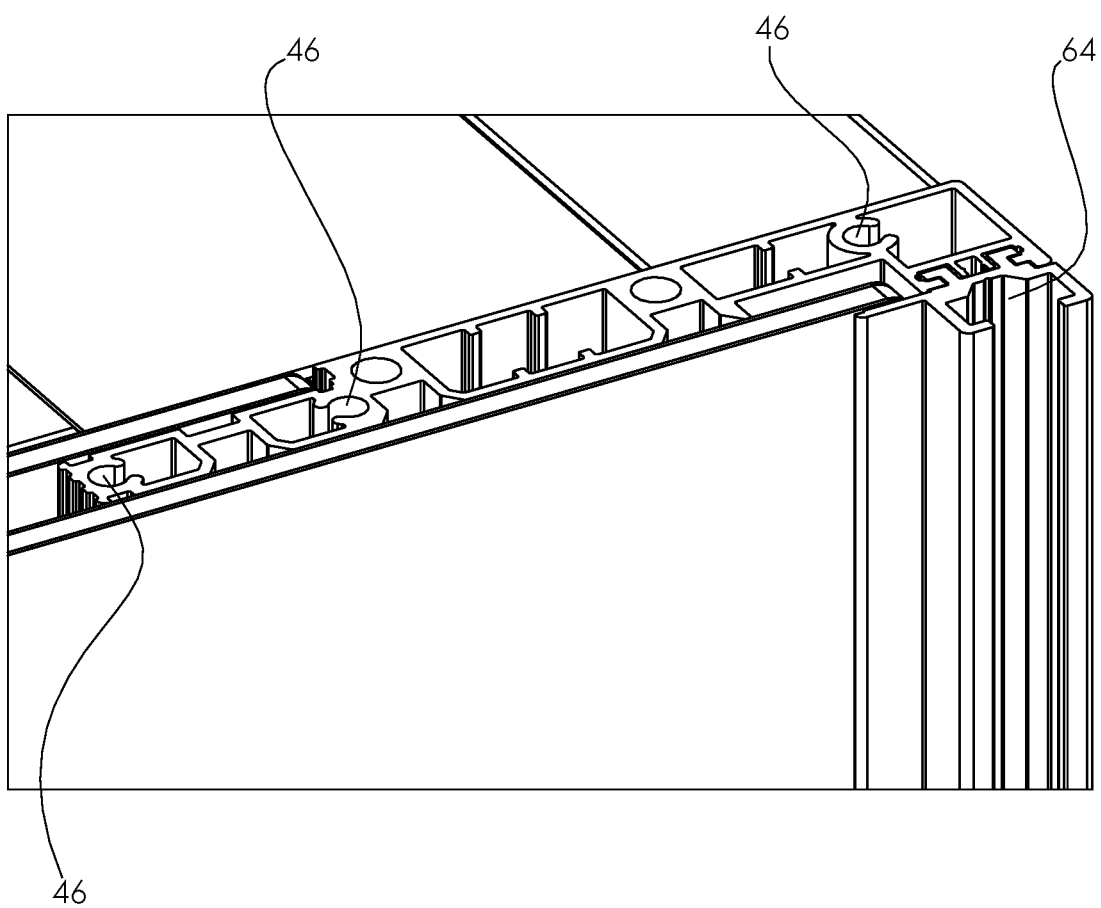
FIG. 16 is a perspective side view of a carcass corner with a hanger channel.
Figure 17:
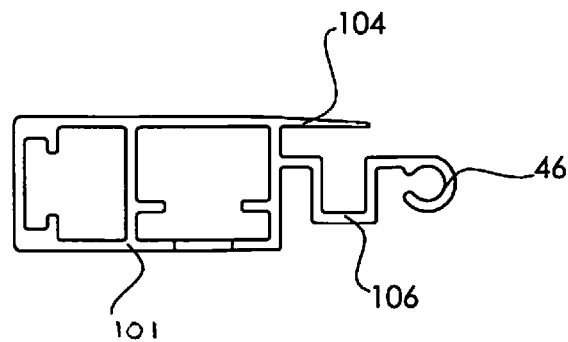
FIG. 17 is a cross sectional view of an extrusion used for adjustable shelves.

Looking at FIGS. 15, 16 and 25 hanger strip 118 is engaged in a first zipper channel 64. Here there is a "C" shaped channel 120 for the attachment of display bars, handles, pulls etc., added to a trim strip. This allows the attachment to be made onto a cabinet with an exterior panel.

While disclosed made of extruded aluminum, it is known that other materials of construction may be utilized such as polymers, steels, brass alloys, carbon fibre, fiberglass, glass/polymer mixtures and the equivalent.

While certain features and aspects have been described with respect to exemplary embodiments, one skilled in the art will recognize that numerous modifications are possible. While certain functionality is ascribed to certain system components, unless the context dictates otherwise, this functionality can be distributed among various other system components in accordance with the several embodiments.

Figure 18:
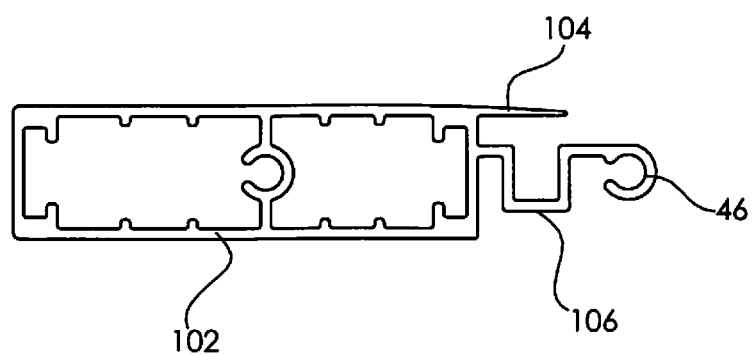
FIG. 18 is a cross sectional view of a first alternate embodiment horizontal member.
Figure 19:
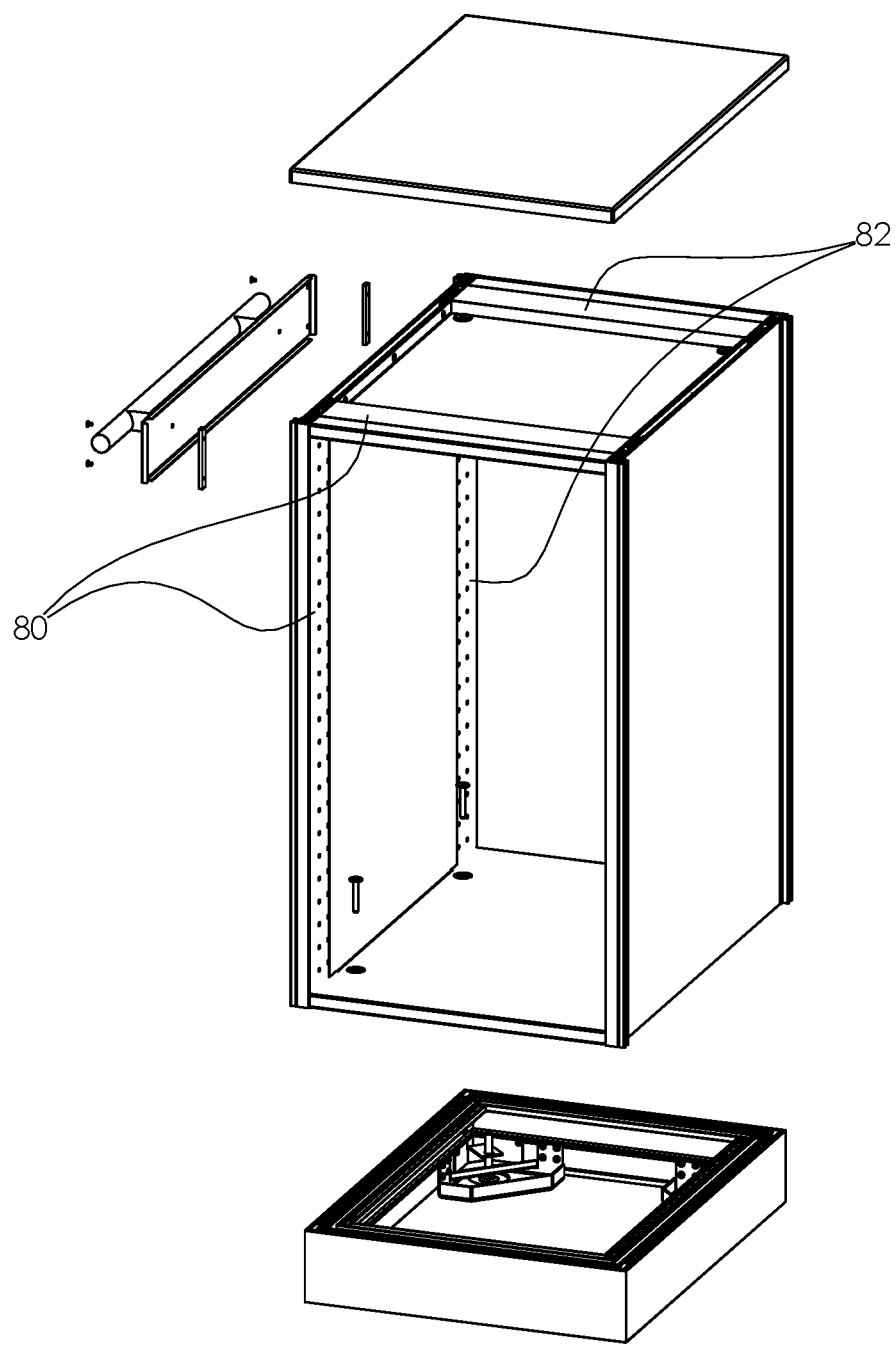
FIG. 19 is an exploded view of a an assembled carcass atop a base.

System components described according to a particular structural architecture and/or with respect to one system may be organized in alternative structural architectures and/or incorporated within other described systems. For example, FIGS. 18 and 19 show a extrusion used for adjustable shelves 101, and first alternate embodiment horizontal member 102. These also embody an aluminum extrusion linear member with at least one "C" shaped screw buss 46 and at least two parallel and linear voids formed therein. They differ from the vertical member 20 in that they each incorporate a panel lip with a ¼ inch spacing from the screw buss to accommodate the retention of a top or bottom panel. It is notable that here that one of the screw busses 46 in each of these embodiments reside outside of the enclosed extrusion, suspended from an arm 106 extending normally from a distal end of the member.

In summary, explained in the simplest terms, the base box carcass assembly method has the following steps:

Providing two or four vertical members 2.
Providing two or no vertical members 40.
Providing two rectangular side panels 94 with orifices at all corners and parallel side edges.
Providing mechanical fasteners.
Determining the box dimensions of height H, width W and depth D.
Determining the thickness (Z) of the vertical member.
Determining the thickness (Y) of the horizontal member.
Cutting the vertical member so that the distance between its proximal end and vertical end is equal to the height of the box (H) ensuring that the distance from the proximal end to the center of the highest orifices (X) is one half of the thickness of the horizontal member (Y).

Optionally, if the distance from the vertical member's distal end to the center of the lowest orifices (X) is not equal to one half of the thickness of the horizontal member (Y), drilling an orifice in the first and third beveled exterior open channels that has its center at the distance X from the distal end. (Note that the existing first, and third linear series of orifices 22 and 26 are spaced vertically so as to eliminate this step for common dimensioned cabinet heights, such as that of kitchen cabinets.)

Cutting the horizontal members to a length between their distal ends 56 and proximal ends 58 equal to the designated width W of the finished box carcass minus two times the thickness Z of the vertical members 2.

Joining two horizontal members 20 to two vertical members 2 to form a rectangular frame 80 by aligning the screw busses 46 of the horizontal members 29 with the first (highest and lowest) orifices from the first linear series of orifices 22 in the vertical members 2, and connecting these with eight mechanical fasteners passing through the orifices from the first linear series of orifices 22 and frictionally engaging the mechanical fasteners in the aligned screw busses 26.

Positioning the two identical rectangular frames to be joined, in mirror image configurations.

Abutting two parallel edges of each of the side panels 94 with the inner edge of the rabbets on the two vertical members 2 and sequentially engaging eight mechanical fasteners through the first (highest and lowest) orifices in the third linear series of orifices 26, the four corner orifices in each of the side panels 94 and into eight screw busses 46 in the four horizontal members 20.

Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise.

While there is a multitude of articles of furniture or cabinetry that may be made, the novelty lies in the simplistic fabrication methodology that results in high quality furniture based on joinable vertical and horizontal members with exposed zipper channels. Consequently, although several exemplary embodiments are described above, it will be appreciated that the invention is intended to cover all modifications and equivalents within the scope of the following claims.

Having thus described the invention, what is claimed as new and desired to be secured by Letters Patent is as follows:

1. A method for the assembly of a box carcass having dimensions of height ("H"), width ("W") and depth ("D"), comprising the steps of:
   providing four vertical linear members, each having an inner side with a first rabbet formed there along, an exterior side with at least two linear series of orifices formed there through, a zipper channel formed along a linear edge of said exterior side, a first distal end, a first proximal end, and a first thickness ("Z");
   providing four horizontal linear members each having an interior face, an exterior face, a second distal end, a second proximal end, a second thickness ("Y") and at least two screw busses formed therein said horizontal member;
   providing two rectangular, planar side panels with parallel side edges and corner orifices formed there through;
   providing at least one mechanical fastener;

cutting said vertical members so that a distance between said first proximal ends and said first distal ends is equal to the height of said box carcass ("H"), and that a distance from said first proximal ends to a center of a top orifice in each of said at least two linear series of orifices is one half of said second thickness ("X");

wherein each of said at least two linear series of orifices include a bottom orifice, and if a distance from said vertical member's distal end to a center of a bottom orifice in each of said at least two linear series of orifices is not equal to one half of said second thickness ("X"), drilling an extra pair of bottom orifices in each of said at least two linear series of orifices in said vertical member, with centers at a distance equal to one half of said second thickness ("X") from said vertical member's distal end;

cutting said horizontal members to a length between said distal ends and said proximal ends equal to said width ("W") of said box carcass minus two times said thickness of said vertical members ("Z");

connecting four said horizontal members to four said vertical members to form two rectangular frames by aligning said screw busses of said horizontal members with said top orifices and either of said bottom orifices or said extra pair of bottom orifices in said at least two linear series of orifices in said vertical members, connecting said horizontal members and said vertical members with eight of said at least one mechanical fasteners passing through said top orifices and either of said bottom orifices or said extra pair of bottom orifices in said two linear series of orifices in said vertical members and frictionally engaging said mechanical fasteners in said aligned screw buss;

positioning said two rectangular frames in opposing, mirror image configurations, and abutting two of said parallel edges of each of said side panels with an inner edge of said rabbets on said two vertical members of said frames, and sequentially engaging another eight of said at least one mechanical fasteners through said top and bottom orifices in a third linear series of orifices of said at least two linear series of orifices, said four corner orifices in each of said side panels and into the at least two screw busses in each of said four horizontal members.

2. The method for the fabrication of a box carcass of claim 1 wherein said vertical linear members have at least two tapered linear channels formed along said exterior side, and wherein said linear series of tapered orifices are formed there through said linear channels.

3. The method for the fabrication of a box carcass of claim 1 wherein said vertical linear members have at least one vertical linear void formed there through.

4. The method for the fabrication of a box carcass of claim 3 wherein said vertical linear members have at least one screw buss formed therein said vertical linear void.

5. The method for the fabrication of a box carcass of claim 2 wherein said vertical linear members have at least one vertical linear void formed there through.

6. The method for the fabrication of a box carcass of claim 1 wherein said horizontal linear members have a second rabbet formed there along said exterior face.

7. The method for the fabrication of a box carcass of claim 1 wherein said horizontal linear members have a horizontal linear void formed there through.

8. The method for the fabrication of a box carcass of claim 7 wherein said screw busses are formed in said horizontal linear void.

\* \* \* \* \*